March 18, 1958 E. M. DE COURSEY 2,826,902
FRICTION CLUTCH PLATE
Filed Sept. 1, 1955
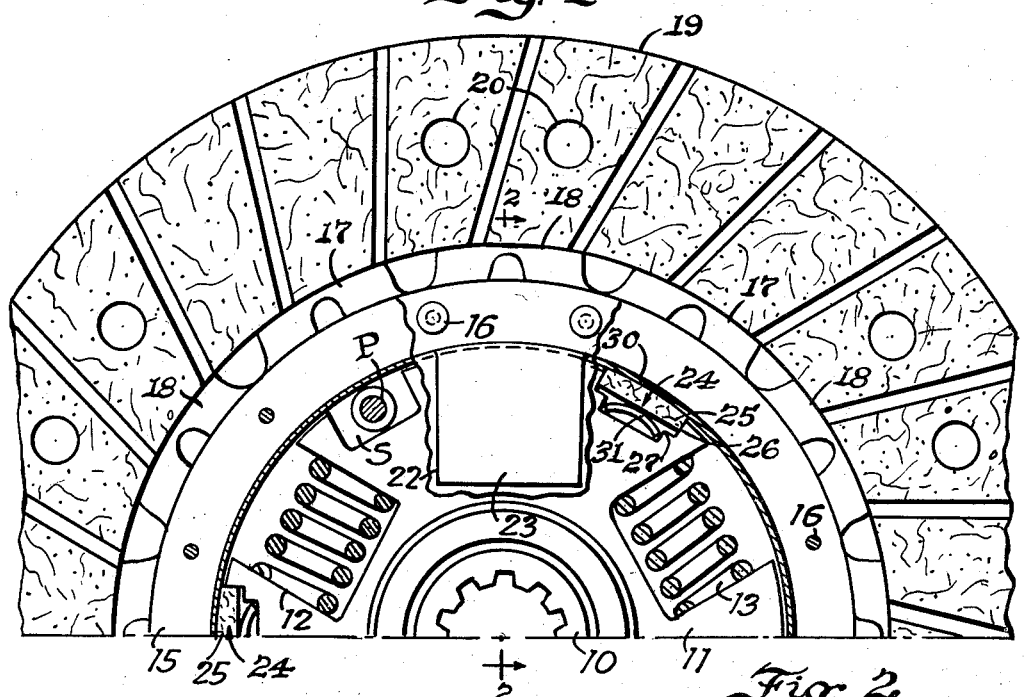
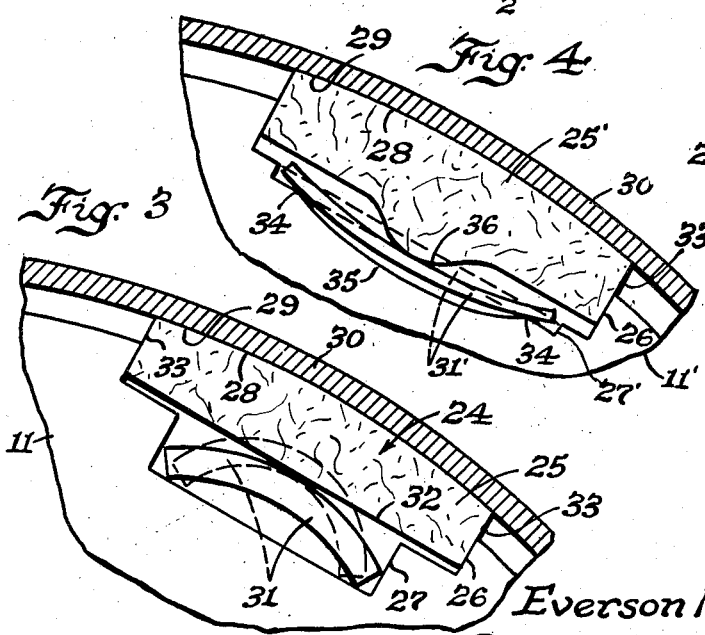
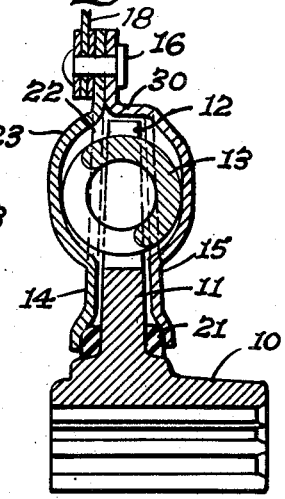
Inventor
Everson M. DeCoursey

United States Patent Office 2,826,902
Patented Mar. 18, 1958

2,826,902

FRICTION CLUTCH PLATE

Everson M. De Coursey, Auburn, Ind., assignor to Dana Corporation, Toledo, Ohio, a corporation of Virginia Application September 1, 1955, Serial No. 531,985

4 Claims. (Cl. 64—27)

This invention relates to motion transmitting elements, and is more particularly concerned with improvements in automotive type friction clutch plates, although the present improvements are substantially equally applicable to what are known commercially as vibration dampeners, the present improvements being concerned with shock absorption and vibration dampening.

The principal object is to provide a motion transmitting element, such as a clutch plate, having spring means between the relatively oscillatory inner and outer elements, and incorporating friction brake or drag means in the spaces between springs to check the recoil action of the springs so as to smoothen the drive. In some previous constructions, the braking action occurred between the hub element and the cover plates, but, as pointed out hereinafter, that arrangement not only located the drag too close to the axis of rotation for a good mechanical advantage, but the location was bad from the standpoint that dirt and grit working its way between these relatively moving parts changed the frictional resistance to movement to such an extent that no two plates could be predicted to work alike. By locating the friction brake means between springs, as far from the axis of rotation as the hub construction permits, namely, at a maximum radius from the axis of rotation, I obtain the best mechanical advantage and at the same time avoid the other serious objection mentioned. The present construction is, in this respect, among others, an improvement on that disclosed in Thelander Patent No. 2,674,863.

In prior constructions manually adjustable friction brake means were provided, as shown, for example, in Wemp Patent No. 1,750,828, but they were not satisfactory for the following reasons:

(1) The original adjustment made at the factory, at the time of assembly of the plate, lasted only a short time because the springs used in connection with the braking means for spring loading invariably had such a high rate of change that only a little wear was enough to throw the brake means almost completely out of commission, and (2) A new adjustment could not be made with any degree of accuracy without removal of the plate from the clutch for testing in a brake test rig, which, of course, would not be practical in most cases because of the great expense that that would entail.

It is, therefore, another important object of my invention to avoid those objections by providing the spring means relied upon for the brake effect of a form having such a low rate of change that the small amount of wear that will occur has no appreciable effect upon the braking action, the spring means employed being, furthermore, of a type which needs no manual adjustment, so that the structure is virtually self-adjusting or self-compensating for wear, and it is practical to incorporate the same inside the clutch plate assembly, it being no longer necessary that it be accessible.

In accordance with my invention, three friction lag units are provided in equally circumferentially spaced relation in the hub assembly, each consisting of a spring-pressed brake shoe slidable radially in a notch provided in the periphery of the annular flange of the hub member, each shoe having a bowed leaf spring urging the same outwardly into tight frictional engagement with the peripheral wall of the hub enclosing housing defined by plates disposed on opposite sides of the flange, which also provide spring receiving pockets with abutments for the ends of the springs disposed in the usual way in circumferentially spaced notches in the flange, the spring pressure of the leaf springs on the brake shoes insuring the desired braking action throughout the life of the clutch plate without need for any adjustment. The brake shoes may be molded economically to the final form desired from brake lining material, composition material, or sintered material.

The invention is illustrated in the accompanying drawing, in which—

Fig. 1 is a rear view of a half portion of a clutch plate made in accordance with my invention showing most of the one hub housing plate broken away so as to better illustrate the novel hub construction and also showing one of the brake shoes and a portion of another, as well as the stop for positively limiting relative movement and accordingly limiting compression of the cushioning spring;

Fig. 2 is a section on the line 2—2 of Fig. 1 on a larger scale;

Fig. 3 is an enlargement of a portion of Fig. 1 to better illustrate the brake shoe and related bowed leaf spring, and Fig. 4 is a view similar to Fig. 3 showing a modified or alternative construction.

Similar reference numerals are applied to corresponding parts throughout these views.

Referring to the drawing, and mainly Figs. 1 to 3, the clutch plate shown comprises relatively rotatably inner and outer portions, the inner portion being formed by a center hub 10, splined for driving connection with the driving shaft of an automotive transmission and provided with an annular flange 11 in which there are circumferentially spaced notches 12, one for each of a plurality of spring cushioning means 13. Two circular plates 14 and 15 are disposed on opposite sides of the flange 11 and are suitably secured together by rivets 16. These rivets also serve to fasten two series of like stamped sheet metal segments 17 and 18 in two parallel planes to the outer peripheral portion of plate 14 to complete the assembly of the outer element of the clutch plate. Annular friction facing rings 19 are riveted, as indicated at 20, one to alternate segments 18 that are in one plane, the other to the intermediate segments 17 that are in the other plane. It is unnecessary to go here into the further details of this portion of the plate's construction inasmuch as the "mush" details are not involved. Gasket rings 21 of neoprene rubber or other compressible resilient material are provided encircling the hub 10 on opposite sides of flange 11 to seal the plate against ingress of dirt and grit between the relatively oscillatory inner and outer portions of the plate.

In operation, when relative movement occurs between the inner and outer portions of the clutch plate the springs 13 are compressed to cushion the drive. A stop pin P secured to plates 14 and 15 and extending through slot S in the flange 11 serves to limit relative movement and accordingly limit compression of the springs 13. In the relative movement between the flange 11 and plates 14 and 15 the springs 13 are compressed between one end of the notches 12 and shoulders 22 at the other end of the pockets 23, the springs being compressed to whatever extent is required to overcome the resistance to turning of the propeller shaft drivingly connected with the shaft driven by hub 10. The springs 13 are preloaded to a predetermined extent when inserted in notches 12 in order that they will offer the right drive and cushioning action. After the resistance to turning of the propeller shaft has been overcome and the springs 13 tend to recoil, the return of the parts to their initial relationship is, in accordance with the present invention, frictionally resisted by a plurality of friction lag units indicated generally by the reference numeral 24. The present plate has six cushioning springs 13 in equally circumferentially spaced relation and three friction lag units in equally circumferentially spaced relation between the springs, all of said units being at a maximum radius from the axis of rotation, as clearly appears in Fig. 1, with a view to obtaining the best mechanical advantage and at the same time avoiding the objection that dirt and grit working its way between the relatively moving parts of the plate would interfere with obtaining the desired amount of frictional resistance to movement, as previously mentioned. Each brake lag unit consists of a brake shoe 25 slidable radially in the wider outer portion 26 of a radial notch 27 provided in the peripheral portion of the flange 11 and spring-pressed outwardly for engagement of its arcuate radially outer face 28 on the inner circumference 29 of the annular peripheral wall 30 provided on the plate 15 in radially outwardly spaced relation to the periphery of the flange 11, there being either a single relatively thick bowed leaf spring 31 behind each shoe 25 to furnish the spring pressure, or a stack of thinner bowed leaf springs arranged to give substantially the same results. The bowed leaf spring or springs 31 prior to assembly in the hub have substantially the form indicated in dotted lines but are more or less flattened to the longer radius form indicated in full lines in Fig. 3 when the brake shoes are assembled in the hub prior to the riveting together of the plates 14 and 15 with the plate segments 17 and 18, as previously described. Shoes 25 may be molded of any suitable friction facing material, such as brake lining material, composition material or sintered material, namely, compressed, powdered metal. The arcuate outer faces 28 on the shoes 25 frictionally engaging the inner circumference of the annular wall 30 under the spring pressure of springs 31 provide the desired friction drag or braking action, and this frictional resistance or drag does not vary to any appreciable extent with what little wear occurs due to the small amount of relative movement between the parts in the operation of the clutch and due to the low rate of change of springs 31. Inasmuch as the springs 31 apply pressure at the middle of the flat inner end 32 of the shoes and the shoes are guided by the engagement of their parallel end surfaces 33 with the parallel end surfaces 26 in the notches 27 it should be clear that the shoes 25 will wear substantially uniformly from end to end of the arcuate surfaces 29, and a smooth, quiet drive is obtained.

Normally flat leaf springs, like that indicated in full lines in bowed form at 31' in Fig. 4 may be used in lieu of the normally bowed leaf springs 31, and, with such a construction, fulcrum points 34 are provided intermediate the ends of the notches 27' provided in flange 11', each of the notches 27' being cut away between the fulcrum points 34, as indicated at 35, to allow for the bowing of the flat leaf spring (or stack of thinner springs). Each of the brake shoes 25' is generally similar in form to the shoes 25 in so far as the arcuate braking surface 28 is concerned and the parallel end surfaces 33 are concerned, but, instead of the flat inner surface 32, there is a rounded inwardly extending projection 36 which has line contact with the leaf spring 31' at the middle thereof and serves to bow the leaf spring when the shoe 25' is assembled in the hub prior to the riveting together of plates 14 and 15, as above described. The operation of this construction is substantially the same as that shown in Fig. 3.

It is believed the foregoing description conveys a good understanding of the objects and advantages of my invention. The appended claims have been drawn to cover all legitimate modifications and adaptations.

I claim:

1. In a rotary motion transmitting element, such as a friction clutch plate, vibration dampener, and the like, comprising a hub member having a flange, and a plate member having portions overlying opposite sides of the flange and oscillatable relative thereto, spring means in closely circumferentially spaced relation with respect to said flange yieldably cushioning relative rotary movement between said members, said flange having a notch of elongated form circumferentially of the flange in the peripheral portion thereof between two of said spring means, a brake shoe of elongated form circumferentially of the flange and of relatively small dimension measured radially of the flange slidable radially in said notch and slidably engaging on its radially outer side a portion of said plate member frictionally to resist relative rotary movement between said members in both directions, and compressible resilient means of small dimension measured radially of the flange and of elongated form circumferentially of the flange compressed radially between the flange and the radially inner side of said shoe pressing the latter into tight frictional engagement with said plate member.

2. In a rotary motion transmitting element, such as a friction clutch plate, vibration dampener, and the like, comprising a hub member having a flange, and a plate member having portions overlying opposite sides of the flange and oscillatable relative thereto, the plate and flange having a series of closely circumferentially spaced rectangularly shaped registering coiled spring receiving portions, coiled springs in said portions compressible between said hub and plate members to cushion relative rotary movement therebetween, said flange having a series of notches of elongated form circumferentially of the flange in the peripheral portion thereof between said spring receiving portions, all at the same radius with reference to the axis of rotation, a brake shoe of elongated form circumferentially of the flange and of relatively small dimension measured radially of the flange received in each of said notches slidable radially and slidably engaging on its radially outer side a portion of said plate member frictionally to resist relative rotary movement between said members in both directions, and compressible resilient means of small dimension measured radially of the flange and of elongated form circumferentially of the flange compressed radially between the flange and the radially inner side of said shoe pressing the latter into tight frictional engagement with said plate member.

3. In a rotary motion transmitting element, such as a friction clutch plate, vibration dampener, and the like, comprising a hub member having a flange, and a plate member having portions overlying opposite sides of the flange and oscillatable relative thereto, spring means in closely circumferentially spaced relation with respect to said flange yieldably cushioning relative rotary movement between said members, said flange having a notch of elongated form circumferentially of the flange in the peripheral portion thereof between two of said spring means, a brake shoe of elongated form circumferentially of the flange and of relatively small dimension measured radially of the flange slidable radially in said notch and slidably engaging on its radially outer side a portion of said plate member frictionally to resist relative rotary movement between said members in both directions, and a bowed leaf spring of small dimension measured radially of the flange and of elongated form circumferentially of the flange disposed in the notch behind the radially inner side of the shoe pressing the latter into tight frictional engagement with said plate member, said notch having shoulders defined therein adjacent the opposite ends thereof arranged for abutment with the ends of said spring to limit displacement thereof in either direction circumferentially of the flange from a substantially central position with respect to the shoe.

4. In a rotary motion transmitting element, such as a friction clutch plate, vibration dampener, and the like, comprising a hub member having a flange, and a plate member having portions overlying opposite sides of the flange and oscillatable relative thereto, the plate and flange having a series of closely circumferentially spaced rectangularly shaped registering coiled spring receiving portions, coiled springs in said portions compressible between said hub and plate members to cushion relative rotary movement therebetween, said flange having a series of notches of elongated form circumferentially of the flange in the peripheral portion thereof between said spring receiving portions, all at the same radius with reference to the axis of rotation, a brake shoe of elongated form circumferentially of the flange and of relatively small dimension measured radially of the flange received in each of said notches slidable radially and slidably engaging on its radially outer side a portion of said plate member frictionally to resist relative rotary movement between said members in both directions, and a bowed leaf spring of small dimension measured radially of the flange and of elongated form circumferentially of the flange disposed in each notch behind the radially inner side of the shoe pressing the latter into tight frictional engagement with said plate member, each of said notches having shoulders defined therein adjacent the opposite ends thereof arranged for abutment with the ends of the associated spring to limit displacement thereof in either direction circumferentially of the flange from a substantially central position with respect to the associated shoe.

References Cited in the file of this patent

UNITED STATES PATENTS

| | | |
|---|---|---|
| 1,749,554 | Wichert | Mar. 4, 1930 |
| 2,053,180 | Carter | Sept. 1, 1936 |
| 2,422,121 | Norstrom et al. | June 10, 1947 |